United States Patent
Tsubaki et al.

(10) Patent No.: US 12,308,180 B2
(45) Date of Patent: May 20, 2025

(54) ELECTROLYTIC CAPACITOR AND METHOD FOR PRODUCING SAME

(71) Applicant: Panasonic Intellectual Property Management Co., Ltd., Osaka (JP)

(72) Inventors: Yuichiro Tsubaki, Kyoto (JP); Kazuhiro Takatani, Hyogo (JP); Miyoko Masuda, Kyoto (JP); Kenta Chashiro, Osaka (JP); Shumpei Matsushita, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 17/815,259

(22) Filed: Jul. 27, 2022

(65) Prior Publication Data

US 2022/0359125 A1    Nov. 10, 2022

Related U.S. Application Data

(63) Continuation of application No. PCT/JP2021/007136, filed on Feb. 25, 2021.

(30) Foreign Application Priority Data

Feb. 28, 2020 (JP) .................................. 2020-033905
Feb. 28, 2020 (JP) .................................. 2020-033906

(51) Int. Cl.
*H01G 9/008*  (2006.01)
*H01G 9/055*  (2006.01)
(Continued)

(52) U.S. Cl.
CPC ............. *H01G 9/008* (2013.01); *H01G 9/055* (2013.01); *H01G 9/10* (2013.01); *H01G 13/04* (2013.01)

(58) Field of Classification Search
None
See application file for complete search history.

(56) References Cited

U.S. PATENT DOCUMENTS 2,177,086 A * 10/1939 Williams ............... H01G 9/008
                                                          29/25.03
3,789,502 A *  2/1974 Callins .................. H01G 9/008
                                                          29/25.03
(Continued)

FOREIGN PATENT DOCUMENTS

JP       2-000715 U      1/1990
JP       4-028215        1/1992
(Continued)

OTHER PUBLICATIONS

International Search Report of PCT application No. PCT/JP2021/007136 dated May 25, 2021.

*Primary Examiner* — Eric W Thomas
(74) *Attorney, Agent, or Firm* — Rimon P.C.

(57) ABSTRACT

A method for manufacturing an electrolytic capacitor includes a first connection step, a second connection step, a first insertion step, a housing step, and a sealing step. In the first connection step, a first internal lead having a foil shape is connected to a first electrode foil. In the second connection step, after the first connection step, a first external lead having a rod shape is connected to the first internal lead to obtain the first electrode. In the first insertion step, the first external lead is inserted into an insertion port of a sealing plate after the second connection step. In the housing step, the first electrode is housed in a container after the first insertion step. In the sealing step, an opening of the container is closed with the sealing plate after the housing step.

17 Claims, 7 Drawing Sheets

(51) Int. Cl.
*H01G 9/10* (2006.01)
*H01G 13/04* (2006.01)

(56) References Cited

U.S. PATENT DOCUMENTS

| | | | | |
|---|---|---|---|---|
| 4,208,699 A * | 6/1980 | Philpott | ............... | H01G 9/10 |
| | | | | 29/25.03 |
| 6,307,732 B1 * | 10/2001 | Tsubaki | ............. | H01G 9/022 |
| | | | | 252/62.2 |
| 2004/0095709 A1 * | 5/2004 | Hata | .................. | H01G 9/08 |
| | | | | 361/513 |
| 2006/0034036 A1 * | 2/2006 | Miura | ................. | H01G 9/04 |
| | | | | 361/511 |
| 2009/0086410 A1 * | 4/2009 | Tsubaki | ............. | H01G 9/045 |
| | | | | 361/505 |
| 2019/0311858 A1 | 10/2019 | Will et al. | | |

FOREIGN PATENT DOCUMENTS

| | | | |
|---|---|---|---|
| JP | 05129164 A * | 5/1993 | |
| JP | 10-229032 | 8/1998 | |
| JP | 2012-004481 | 1/2012 | |
| JP | 2020-503668 | 1/2020 | |

\* cited by examiner

ELECTROLYTIC CAPACITOR AND METHOD FOR PRODUCING SAME

BACKGROUND

1. Technical Field

The present disclosure relates to an electrolytic capacitor and a method for manufacturing the electrolytic capacitor.

2. Description of the Related Art

An electrolytic capacitor usually includes a capacitor element, a lead connected to the capacitor element, a container that houses the capacitor element and the lead, and a sealing plate that closes an opening of the container. The lead is led out to an outside through the sealing plate. Unexamined Japanese Patent Publication No. 2020-503668 teaches that a plurality of leads are connected to an anode foil and a cathode foil, respectively. Unexamined Japanese Patent Publication No. H10-229032 teaches a method in which a conductive rivet is disposed on a sealing plate, and a plurality of leads are connected to the conductive rivet to draw out an electrode to an outside.

SUMMARY

A method for manufacturing an electrolytic capacitor according to a first aspect of the present disclosure is a method for manufacturing an electrolytic capacitor including a first electrode and a second electrode. The method includes a first connection step, a second connection step, a first insertion step, a housing step, and a sealing step. In the first connection step, a first internal lead having a foil shape is connected to a first electrode foil. In the second connection step, after the first connection step, a first external lead having a rod shape is connected to the first internal lead to obtain the first electrode. In the first insertion step, the first external lead is inserted into an insertion port of a sealing plate after the second connection step. In the housing step, the first electrode and the second electrode are housed in a container after the first insertion step. In the sealing step, an opening of the container is closed with the sealing plate after the housing step.

An electrolytic capacitor according to a second aspect of the present disclosure includes: a first electrode including a first electrode foil, a first internal lead having a foil shape and connected to the first electrode foil, and a first external lead having a rod shape and connected to the first internal lead; a second electrode; a container that houses the first electrode and the second electrode; and a sealing plate that closes an opening of the container. The first external lead is inserted into an insertion port of the sealing plate and led out of the container. A length of a first lead-out part of the first internal lead is less than or equal to a maximum diameter of the container. The first lead-out part is a part from an end surface of the first electrode foil of the first internal lead to a contact part with the first external lead.

An electrolytic capacitor according to a third aspect of the present disclosure includes: a first electrode including a first electrode foil, a first internal lead having a foil shape and connected to the first electrode foil, and a first external lead having a rod shape and connected to the first internal lead; a second electrode; a container that houses the first electrode and the second electrode; and a sealing plate that closes an opening of the container. The first external lead is inserted into an insertion port of the sealing plate and led out of the container. The sealing plate includes a rubber member. An international rubber hardness degree of the rubber member is less than or equal to 99.

According to the present disclosure, equivalent series resistance (ESR) of an electrolytic capacitor can be reduced.

DETAILED DESCRIPTIONS OF EMBODIMENT

Figure 1:
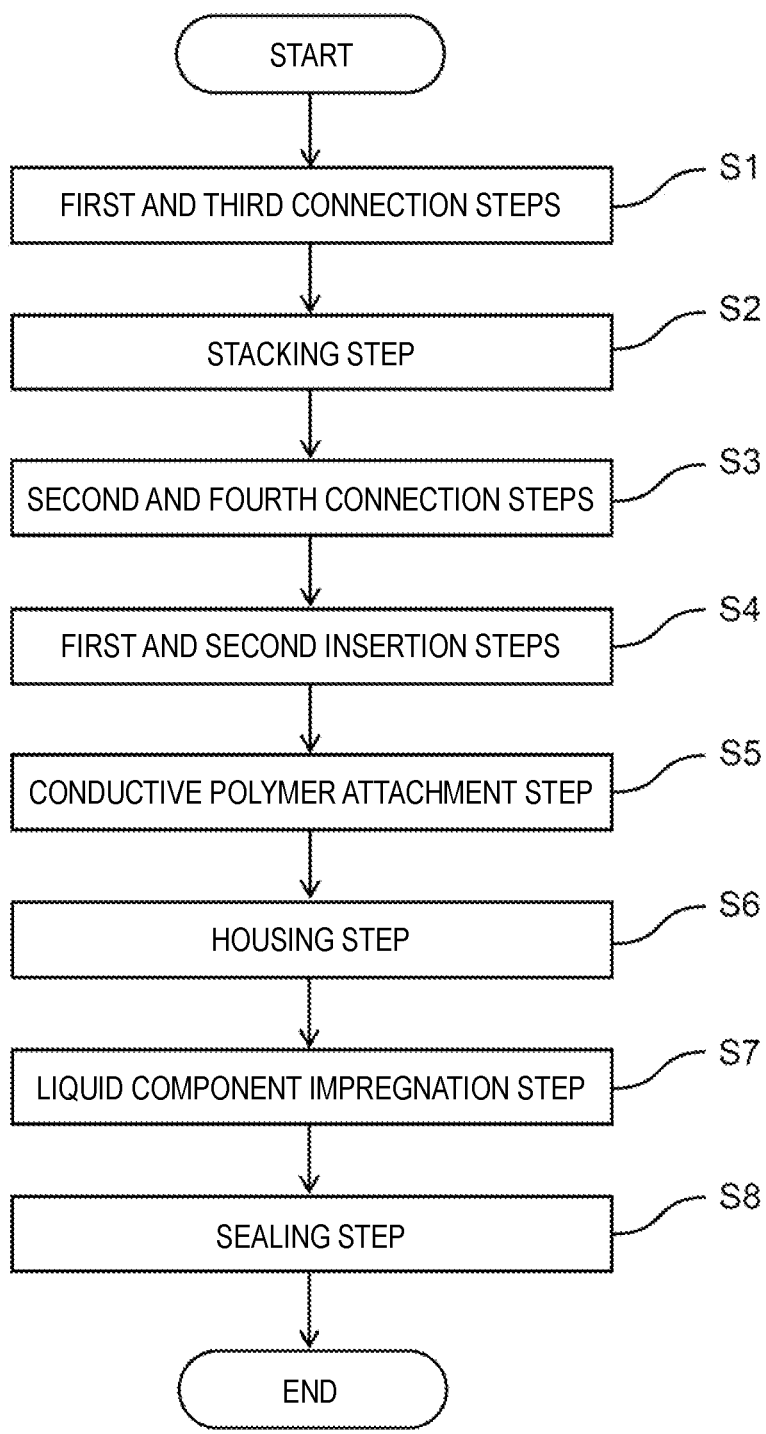
FIG. 1 is a flowchart showing a manufacturing method according to an exemplary embodiment of the present disclosure.

In the methods disclosed in Unexamined Japanese Patent Publication No. 2020-503668 and Unexamined Japanese Patent Publication No. H10-229032, ESR of an electrolytic capacitor cannot be sufficiently reduced.

A foil-shaped lead lacks rigidity. Thus, a foil-shaped internal lead is usually connected to an external terminal having rigidity and conductivity. An electrode is led out to an outside through the external terminal. As disclosed in Unexamined Japanese Patent Publication No. H10-229032, this external terminal is usually attached to a sealing plate. The foil-shaped lead is joined to the external terminal attached to the sealing plate by pressure welding or welding. At this time, it is necessary to sufficiently lead out the internal lead from the electrode foil so that the sealing plate does not interfere with a jig or the like of a joint device.

By using a conductive polymer or leading out a plurality of the leads from one electrode, the inter-electrode resistance of a capacitor element is decreasing. Hence, a length of the internal lead has a relatively high influence on the increase in resistance of the capacitor element. For example, as described above, the internal lead let out long for connection with the external terminal increases the resistance of the capacitor element. As a result, ESR of the electrolytic capacitor also increases.

In the present exemplary embodiment, when the electrode is led out to an outside through the foil-shaped internal lead, instead of using a member in which the sealing plate and the external terminal are integrated, the lead and the external terminal are connected, and then the external terminal is inserted into the sealing plate. As a result, it is not necessary to lead out the internal lead long in order to prevent interference between the sealing plate and the jig or the like of the joint device, and an increase in resistance due to the internal lead can be suppressed.

[Manufacturing Method]

A method for manufacturing an electrolytic capacitor according to the present exemplary embodiment includes a first connection step, a second connection step, a first insertion step, a housing step, and a sealing step. In the first connection step, a foil-shaped first internal lead is connected to a first electrode foil. In the second connection step, after the first connection step, a rod-shaped first external lead is connected to the first internal lead to obtain a first electrode. In the first insertion step, after the second connection step, the first external lead is inserted into an insertion port of a sealing plate. In the housing step, the first electrode and a second electrode are housed in a container after the first insertion step. In the sealing step, an opening of the container is closed with the sealing plate after the housing step.

When a foil-shaped internal lead is connected to a second electrode foil, the second electrode may be prepared in the same manner as the first electrode. That is, the manufacturing method according to the present exemplary embodiment may include a third connection step of connecting a foil-shaped second internal lead to the second electrode foil, a fourth connection step of connecting a rod-shaped second external lead to the second internal lead to obtain the second electrode after the third connection step, and a second insertion step of inserting the second external lead into another insertion port of the sealing plate after the fourth connection step. Accordingly, ESR of the electrolytic capacitor is more easily reduced.

Hereinafter, the present exemplary embodiment will be specifically described by taking, as an example, a case where the first electrode and the second electrode are produced by the same method and are stacked. However, the present exemplary embodiment is not limited thereto. FIG. 1 is a flowchart showing a manufacturing method according to the present exemplary embodiment.

(1) First and Third Connection Steps (S1)

A foil-shaped first internal lead is connected to a first electrode foil. A plurality of first internal leads are preferably connected to the first electrode foil. This is because a moving distance of a charge is shortened and electric resistance is reduced. A method of the connection is not particularly limited, and examples thereof include welding methods such as laser welding and resistance welding.

Similarly, a foil-shaped second internal lead is connected to a second electrode foil. From the same viewpoint, a plurality of second internal leads are preferably connected to the second electrode foil.

The connection positions of the first and second internal leads (Hereinafter, the first and second internal leads may be collectively referred to as an internal lead.) are not particularly limited, and may be appropriately set in consideration of the shapes and the like of the first and second electrode foils (Hereinafter, the first and second electrode foils may be collectively referred to as an electrode foil.) and the electrolytic capacitor. When the electrode foil is wound, the internal lead is connected such that a longitudinal direction of the internal lead is along a winding axis direction.

A size of the internal lead is also not particularly limited. A length of the internal lead in the longitudinal direction may be appropriately set in consideration of a size of the electrode foil, a size of the container, a size of a separator, and the like. According to the present exemplary embodiment, it is not necessary to excessively increase the length of the internal lead in the longitudinal direction.

(2) Stacking Step (S2)

After the first and third connection steps, the first electrode foil and the second electrode foil are stacked. The first electrode foil and the second electrode foil are stacked with, for example, a separator interposed therebetween. The stacked body may be further wound. In this case, the stacked body is wound such that the internal lead extends along the winding axis direction. The stacking step is performed before a sealing step. In terms of simplifying the manufacturing process, the stacking step may be performed before second and fourth connection steps.

(3) Second and Fourth Connection Steps (S3)

A rod-shaped first external lead is connected to the first internal lead, and a rod-shaped second external lead is connected to the second internal lead. As a result, a first electrode and a second electrode are obtained.

When the plurality of internal leads are connected to the electrode foil, it is preferable that the plurality of internal leads connected to the electrode foil having the same polarity are collectively connected to one first external lead or one second external lead (Hereinafter, the first and second external leads may be collectively referred to as an external lead.).

A method of connecting the internal lead and the external lead is not particularly limited. At this time, since the sealing plate is not yet attached to the external lead, it is not necessary to consider interference between the sealing plate and a joint jig. Thus, the connection method is not limited. The connection method may be welding or pressing. Since it is not necessary to consider interference between the sealing plate and the jig, it is not necessary to excessively lead out the internal lead.

Among them, the internal lead and the external lead are preferably connected by press working from the viewpoint of simple equipment. In the case of press working, for example, a through hole is formed in the internal lead, and then the external lead is inserted into the through hole. At this time, the internal lead extends in a first direction (for example, the winding axis direction), and the external lead extends in a second direction intersecting the first direction. Thereafter, both principal surfaces of the internal lead are pressed to crush one end of the external lead. The crushed part of the external lead serves as a stopper to prevent the external lead from coming out of the through hole of the internal lead. In this manner, the external lead is fixed to the internal lead, and the external lead and the internal lead are electrically connected.

The external lead includes, for example, a lead main body part, a first part, and a second part disposed closer to a connecting part with the internal lead than the first part. The first part closes at least a part of an insertion port of the sealing plate The second part has a larger diameter than the insertion port. The second part facilitates positioning of the external lead with respect to the sealing plate, and easily prevents the external lead from coming off the sealing plate. The lead main body part, the first part, and the second part may be made of the same material or different materials.

(4) First and Second Insertion Steps (S4)

The external lead that is connected to the internal lead is inserted into the insertion port of the sealing plate. As a result, the stacked body and the sealing plate are integrated. When the sealing plate includes a rubber member, the first part of the external lead may be press-fitted into the rubber member. As a result, the external lead is more easily prevented from coming off.

As described above, when the internal lead extending in the first direction and the external lead extending in the second direction are connected, the internal lead is bent such that a connecting part of the internal lead with the external lead is along the second direction, and the external lead is disposed such that an extending direction of the external lead is along the first direction. Thereafter, the external lead may be inserted into the sealing plate.

(5) Conductive Polymer Attachment Step (S5)

Before the sealing step, a conductive polymer may be attached to the electrode foil as necessary. The conductive polymer reduces the inter-electrode resistance of the capacitor element. According to the present exemplary embodiment, since the lead-out part of the internal lead can be shortened, an effect of reducing the inter-electrode resistance by the conductive polymer is easily exhibited.

The step of attaching the conductive polymer may be performed at any time before the sealing step. From the viewpoint of handleability, the step of attaching the conductive polymer is preferably performed on the stacked body integrated with the sealing plate after the first and second insertion steps.

The conductive polymer can be attached to the electrode foil by chemical polymerization and/or electrolytic polymerization of a raw material monomer in the presence of the electrode foil. Alternatively, the conductive polymer may be attached to the electrode foil by impregnating the electrode foil with a conductive polymer dispersion liquid or solution containing the conductive polymer and a dispersion medium.

(6) Housing Step (S6)

After the first and second insertion steps, the stacked body integrated with the sealing plate is housed in the container. The stacked body is housed in the container such that the external lead is led out from the opening of the container and the sealing plate can close the opening of the container.

(7) Liquid Component Impregnation Step (S7)

Before the sealing step, the stacked body may be impregnated with a liquid component as necessary. The impregnation step is performed, for example, after the housing step. The liquid component easily improves the self-repairing performance of a dielectric layer. Further, since the liquid component functions as a substantial cathode material, an effect of increasing electrostatic capacitance can be expected. A method for the impregnation is not particularly limited.

(8) Sealing Step (S8)

The produced stacked body is sealed with the container and the sealing plate. Thus, an electrolytic capacitor is completed. Thereafter, an aging treatment may be performed while a rated voltage is applied.

When the sealing plate includes a rubber member, the sealing plate may be disposed at an opening end part of the container to bend the opening end part of the container inward. The sealing plate including the rubber member is caulked by the opening end part without being damaged. Accordingly, the sealing plate is fixed to the container, and the container is sealed. Further, the container may be recessed inward to compress the rubber member. For example, an annular groove is formed in a part of the container facing the rubber member. As a result, even when a diameter of the rubber member is reduced and an internal pressure rises, the separation of the sealing plate is easily suppressed.

Hereinafter, the manufacturing method according to the present exemplary embodiment will be specifically described with reference to the drawings by exemplifying a case where the first and second electrode foils are stacked and wound. However, the present exemplary embodiment is not limited thereto.

Figure 2:
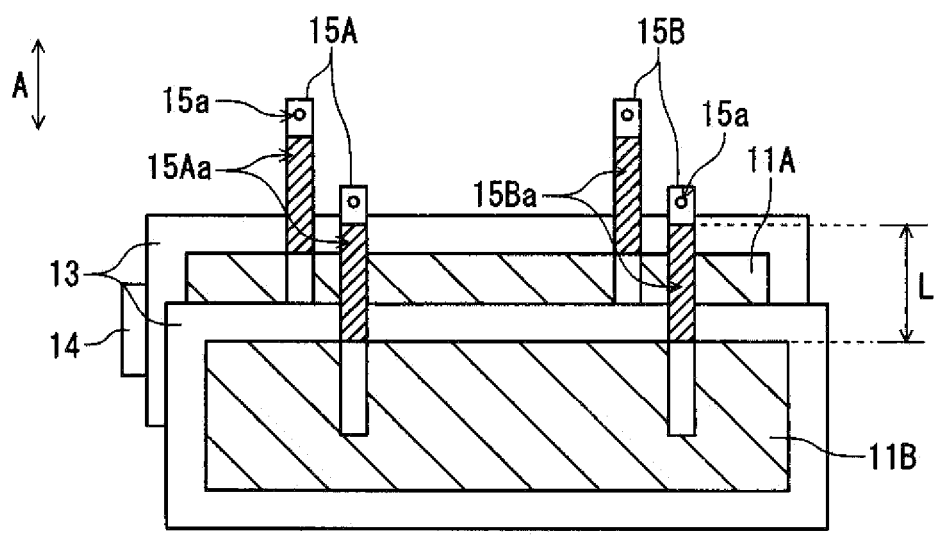
FIG. 2 is a plan view schematically illustrating an electrode foil after first and third connection steps according to the exemplary embodiment of the present disclosure.

FIG. 2 is a plan view schematically illustrating the electrode foils after the first and third connection steps according to the present exemplary embodiment. In FIG. 2, for convenience, the first electrode foil, the second electrode foil, a first lead-out part and a second lead-out part, which will be described later, are hatched. In FIG. 2, positions of the first electrode foil, the second electrode foil, and the separator are shifted for the sake of convenience. The first electrode foil and the second electrode foil are stacked so as to largely overlap each other. The separator is disposed between the first electrode foil and the second electrode foil so that the first electrode foil and the second electrode foil are not in contact with each other.

A plurality of foil-shaped first internal leads 15A are connected to first electrode foil 11A. A plurality of foil-shaped second internal leads 15B are connected to second electrode foil 11B. Through hole 15a is formed at one end part of each of the internal leads. Each of the internal leads is connected such that a longitudinal direction thereof is along a winding axis direction of the electrode foil (a direction indicated by A in the drawing). Each of the internal leads is preferably connected such that when the stacked body is wound, the plurality of internal leads connected to an electrode foil of the same polarity are disposed close to each other. Preferably, the internal leads are connected such that first internal lead 15A and second internal lead 15B are at symmetrical positions with respect to a center of wound body 10 when the stacked body is wound.

Thereafter, first electrode foil 11A, second electrode foil 11B, and separator 13 are stacked and wound. Separator 13 is also disposed on an outermost periphery of the wound body, and a winding end is stopped by winding stop tape 14.

Figure 3:
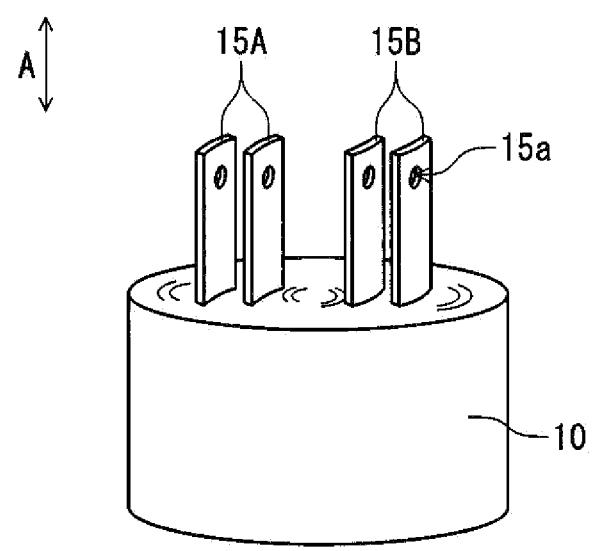
FIG. 3 is a perspective view schematically illustrating an example of a stacked body obtained by a stacking step according to the exemplary embodiment of the present disclosure.

FIG. 3 is a perspective view schematically illustrating an example of a stacked body (wound body) obtained by the stacking step according to the present exemplary embodiment. In FIG. 3, the separator is omitted for the sake of convenience. First and second internal leads 15A, 15B extend along the winding axis direction (direction indicated by A in the drawing) of wound body 10.

Figure 4:
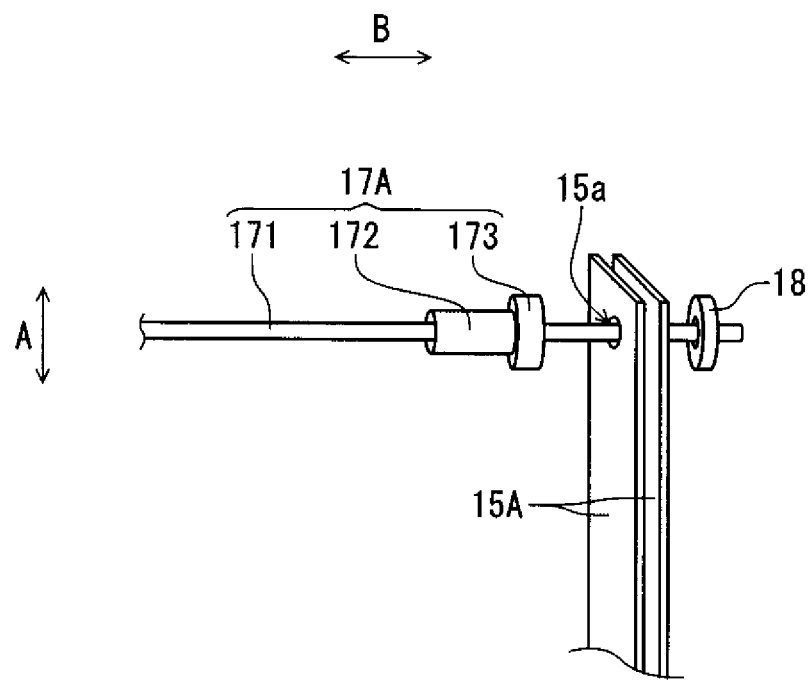
FIG. 4 is a perspective view for explaining second and fourth connection steps of the manufacturing method according to the exemplary embodiment of the present disclosure.

FIG. 4 is a perspective view for explaining the second and fourth connection steps of the manufacturing method according to the present exemplary embodiment. FIG. 4 illustrates a state in which a first external lead is connected to the first internal lead. A second external lead is also connected to the second internal lead by the same method.

First external lead 17A includes lead main body part 171, first part 172, and second part 173. First part 172 is a part fixed to the sealing plate, and closes at least a part of the insertion port of the sealing plate. Second part 173 is disposed closer to a connecting part with first internal lead 15A than first part 172 is, and has a larger diameter than through hole 15a in first internal lead 15A and the insertion port of the sealing plate.

Lead main body part 171 is inserted into through hole 15a of first internal lead 15A. At this time, lead main body part 171 is inserted into through holes 15a of the plurality of first internal leads 15A at one time. Washer 18 is disposed at a side opposite to second part 173, and lead main body part 171 is inserted to washer 18. In this manner, first internal lead 15A is sandwiched between second part 173 and washer 18. Washer 18 is used as necessary. When washer 18 is not used, lead main body part 171 is sufficiently crushed in the next pressing step.

Figure 5:
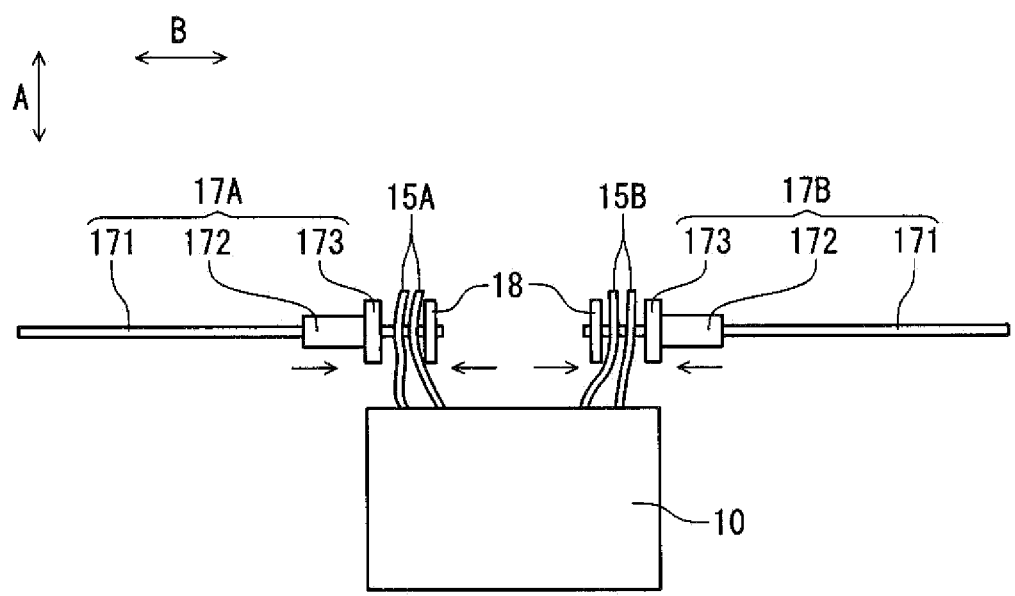
FIG. 5 is a side view schematically illustrating a stacked body and an external lead in the second and fourth connection steps according to the exemplary embodiment of the present disclosure.

FIG. 5 is a side view schematically illustrating the wound body and the external leads in the second and fourth connection steps according to the present exemplary embodiment. First external lead 17A is inserted into the through holes of the plurality of first internal leads 15A, and second external lead 17B is inserted into the through holes of the plurality of second internal leads 15B. At this time, each internal lead extends in the winding axis direction (first direction: direction indicated by A in the drawing), and each external lead extends in a second direction (direction indicated by B in the drawing) intersecting with the winding axis direction. In this state, pressing is performed from both principal surface sides of each internal lead, and an end part of each external lead on a side of washer 18 is crushed. As a result, first external lead 17A is fixed to and connected to the plurality of first internal leads 15A. Similarly, second external lead 17B is fixed to and connected to the plurality of second internal leads 15B.

Figure 6:
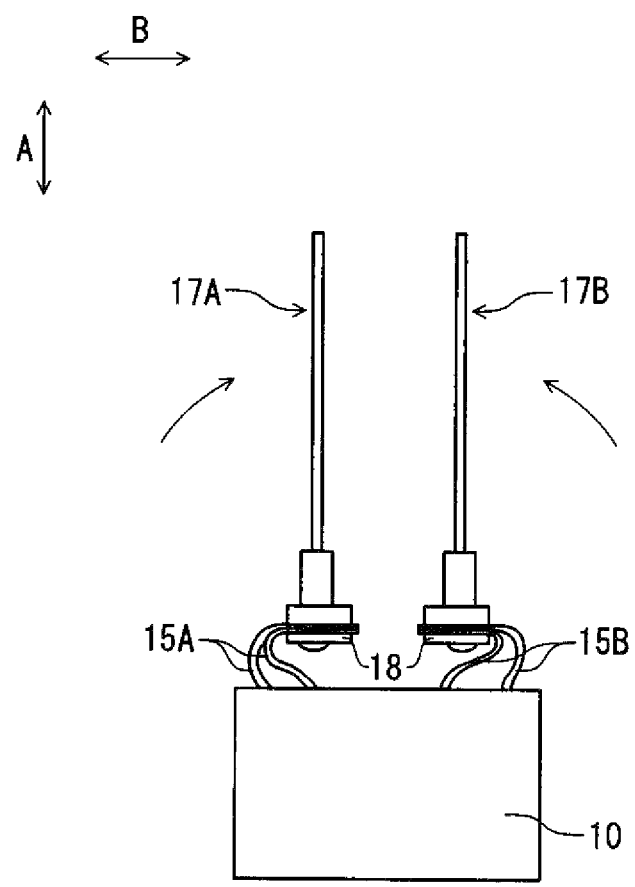
FIG. 6 is a side view for explaining the process following FIG. 5.

FIG. 6 is a side view for explaining the process following FIG. 5. After the internal lead and the external lead are connected, the external lead extending in the second direction (direction indicated by B in the drawing) is rotated so that the extending direction thereof is along the first direction (direction indicated by A in the drawing). At this time, internal leads 15A, 15B are bent, and disposed such that the vicinity of a contact part between the internal lead and the external lead is along the second direction.

Figure 7:
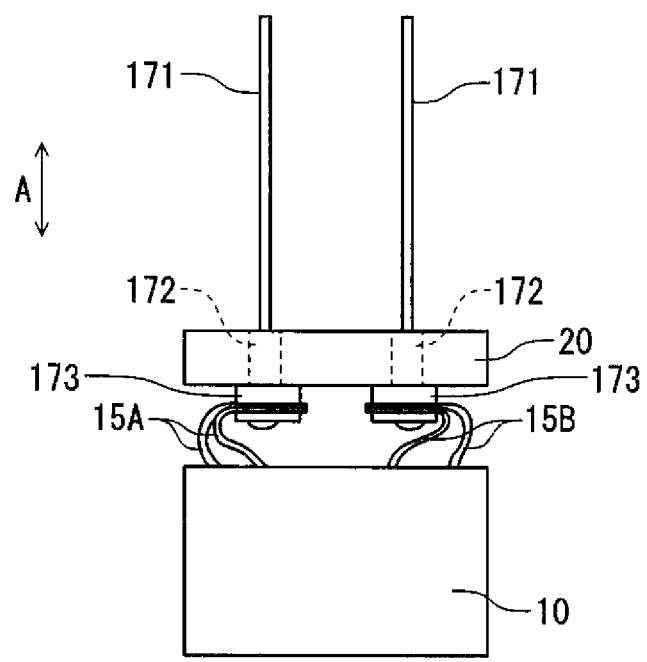
FIG. 7 is a side view schematically illustrating a stacked body after first and second insertion steps according to the exemplary embodiment of the present disclosure.

FIG. 7 is a side view schematically illustrating the wound body after the first and second insertion steps according to the present exemplary embodiment. Sealing plate 20 is brought close to the external lead extending in the first direction (direction indicated by A in the drawing) along the first direction. Each of external leads 17A, 17B is inserted into an insertion port (not illustrated) provided in sealing plate 20. At this time, each external lead is fixed to sealing plate 20 by first part 172. Each external lead is positioned by second part 173. In this way, wound body 10 and sealing plate 20 are integrated.

Subsequently, the conductive polymer may be attached to the electrode foil as necessary.

Figure 8:
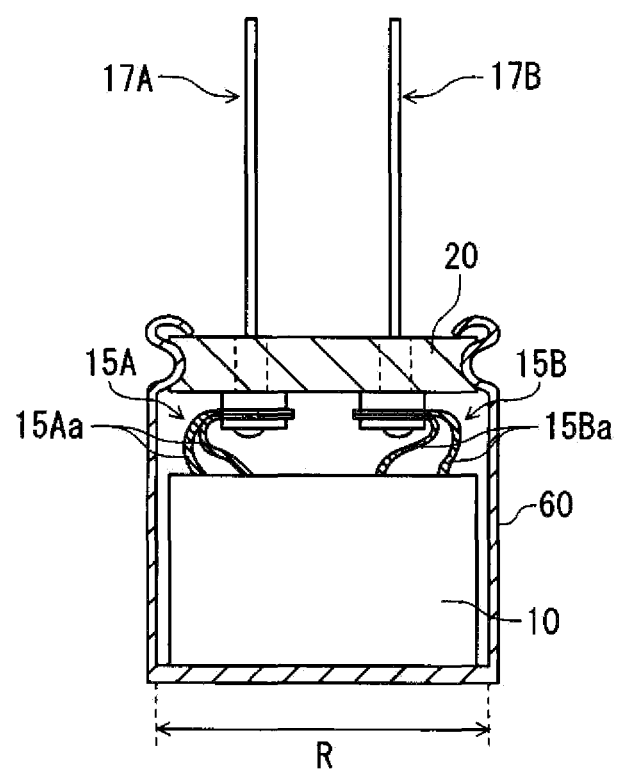
FIG. 8 is a cross-sectional view schematically illustrating an example of an electrolytic capacitor obtained by the manufacturing method according to the exemplary embodiment of the present disclosure.

FIG. 8 is a cross-sectional view schematically illustrating one example of an electrolytic capacitor obtained by the manufacturing method according to the present exemplary embodiment. In FIG. 8, for convenience, the first lead-out part and the second lead-out part are also hatched.

Wound body 10 integrated with sealing plate 20 is housed in container 60. Although the internal lead is bent, lead-out parts 15Aa and 15Ba are short and less than or equal to a maximum diameter (diameter indicated by R in the drawing) of container 60.

Thereafter, the wound body may be impregnated with the liquid component as necessary.

Finally, wound body 10 is sealed by container 60 and sealing plate 20. Thus, electrolytic capacitor 100 is completed. Thereafter, an aging treatment may be performed while a rated voltage is applied.

At the time of sealing, sealing plate 20 is disposed at the opening end part of container 60, and the opening end part of container 60 is bent inward. Thus, the opening end part is caulked to sealing plate 20. Since sealing plate 20 includes a rubber member, the sealing plate is fixed to the opening end part without being damaged. Further, the vicinity of the opening of container 60 is recessed inward so as to reduce the diameter of the rubber member of sealing plate 20. Accordingly, separation of sealing plate 20 is easily suppressed.

Although the method for manufacturing the electrolytic capacitor according to the present exemplary embodiment has been described above by taking the wound electrolytic capacitor as an example, the configuration of the electrolytic capacitor is not limited thereto. The present exemplary embodiment is applicable to, for example, a stacked electrolytic capacitor including a capacitor element including an anode foil and a cathode lead-out layer covering the anode foil.

[Electrolytic Capacitor]

An electrolytic capacitor according to the present exemplary embodiment includes: a first electrode including a first electrode foil, a foil-shaped first internal lead connected to the first electrode foil, and a rod-shaped first external lead connected to the first internal lead; a second electrode; a container that houses the first electrode and the second electrode; and a sealing plate that closes an opening of the container. The first external lead is inserted into an insertion port of the sealing plate and led out of the container.

A length of a first lead-out part of the first internal lead, which is a part from an end surface of the first electrode foil to a contact part with the first external lead, is less than or equal to a maximum diameter of the container. Since the internal lead is short, an increase in resistance due to the lead is suppressed. Such an electrolytic capacitor is manufactured by the method for manufacturing an electrolytic capacitor according to the present exemplary embodiment.

The second electrode preferably has a configuration similar to that of the first electrode in that the ESR is more easily reduced. That is, it is preferable that the second electrode includes a second electrode foil, a foil-shaped second internal lead connected to the second electrode foil, and a rod-shaped second external lead connected to the second internal lead, and a length of a second lead-out part of the second internal lead, which is a part from an end surface of the second electrode foil to a contact part with the second external lead, is less than or equal to the maximum diameter of the container.

The first and second lead-out parts (Hereinafter, it may be collectively referred to as a lead-out part.) are parts of the internal lead protruding from the electrode foil to which the internal lead is connected and not in contact with the external lead (See 15Aa, 15Ba in FIGS. 2 and 8.). Length L of the lead-out part is measured by straightening the internal lead. Length L of the lead-out part is a length of a line segment connecting midpoints of two end parts in the longitudinal direction of the lead-out part.

Maximum diameter R of the container is, for example, the maximum diameter of a bottom surface inside the container (See FIG. 8.).

The length of the lead-out part is preferably less than or equal to 50% of maximum diameter R of the container.

The plurality of internal leads are preferably connected to one electrode foil. As a result, a moving distance of a charge is shortened, and the electric resistance is further reduced. In this case, it is preferable that the internal leads having the same polarity are collectively connected to one external lead.

The internal lead and the external lead may be connected by press working as described above. For example, a through hole is formed in the internal lead, and the external lead is inserted into the through hole and one end part thereof is crushed. In this manner, the external lead may be fixed to and electrically connected to the internal lead.

As described above, the external lead may include a lead main body part, a first part that closes at least a part of the insertion port of the sealing plate, and a second part that is disposed closer to a connecting part with the first internal lead than the first part is and has a larger diameter than the insertion port. This facilitates positioning of the external lead with respect to the sealing plate, and facilitates suppressing the external lead from coming off from the sealing plate. Further, when the sealing plate includes a rubber member, the first part of the external lead can be press-fitted. Thus, the external lead is more easily prevented from coming off. The lead main body part, the first part, and the second part may be made of the same material or different materials.

The lead-out part of the internal lead may have a bent part that bends from a direction toward the opening of the container to a direction intersecting the direction. Since the lead-out part is short, an increase in resistance is suppressed even when the bent part is provided.

The first electrode and the second electrode are stacked with a separator interposed therebetween, for example. The first electrode and the second electrode may be stacked and then further wound. A conductive polymer may be attached to the first electrode and/or the second electrode. The first electrode and/or the second electrode may be impregnated with a liquid component.

The sealing plate may include a rubber member. Since the rubber member has elasticity, it is easy to fix the sealing plate to the container without being damaged and to seal the container. The opening end part may be bent inward in a state where the sealing plate is disposed at the opening end part of the container. As a result, the opening end part is caulked to the sealing plate, and the sealing plate is fixed. Furthermore, the container may be recessed inward to reduce the diameter of the rubber member. Accordingly, even when the internal pressure increases, the sealing plate is easily prevented from coming off.

Hereinafter, constituent members of the electrolytic capacitor according to the present exemplary embodiment will be specifically described. However, the present exemplary embodiment is not limited thereto.

(First Electrode Foil)

The first electrode foil functions as, for example, an anode. In this case, the first electrode foil is a metal foil containing at least one valve metal such as titanium, tantalum, aluminum, or niobium. The first electrode foil may contain the valve metal in the form of an alloy containing the valve metal, a compound containing the valve metal, or the like. A thickness of the first electrode foil is not particularly limited, and is, for example, in a range from 15 μm to 300 μm, inclusive. The thickness is an average value at arbitrary five points (The same applies hereinafter.).

A surface of the first electrode foil may be roughened by etching or the like. A dielectric layer may be formed on the surface of the first electrode foil. The dielectric layer is formed, for example, by subjecting the first electrode foil to an anodizing treatment. In this case, the dielectric layer may include an oxide of a valve metal. Note that the dielectric layer is not limited thereto, and may be any layer that functions as a dielectric material.

(Second Electrode Foil)

The second electrode foil functions as, for example, a cathode. The second electrode foil may be a metal foil. The type of metal is not particularly limited, and may be a valve metal or an alloy containing a valve metal similarly to the first electrode foil, or may be other than a valve metal such as iron (Fe) or copper (Cu). A thickness of the second electrode foil is not particularly limited, and is, for example, in a range from 15 μm to 300 μm, inclusive.

A surface of the second electrode foil may be roughened or subjected to an anodizing treatment as necessary. Further, an inorganic layer containing carbon, nickel, titanium, and an oxide or nitride thereof may be formed on the surface of the second electrode foil.

(First and Second Internal Leads)

The internal lead has a foil shape. Specifically, the internal lead is a conductive member having a thickness in a range from 15 μm to 300 μm, inclusive. The material is not particularly limited as long as it has conductivity, and examples thereof include aluminum, titanium, nickel, copper, iron, tantalum, niobium, and alloys thereof.

(Separator)

The separator is not particularly limited as long as it is porous. Examples of the separator include an unwoven fabric made of cellulose fiber, an unwoven fabric made of glass fiber, a microporous membrane made of polyolefin, a woven fabric, and an unwoven fabric. A thickness of the separator is not particularly limited, and is, for example, in a range from 10 μm to 500 μm, inclusive. When the conductive polymer having a sufficient thickness is disposed between the first electrode foil and the second electrode foil, the separator may be omitted.

(First and Second External Leads)

The external lead is a member used for leading out the electrode to an outside, and has conductivity. The external lead has a rod shape and has rigidity enough to be inserted into the sealing plate. The material is not particularly limited as long as it has conductivity, and examples thereof include aluminum, titanium, nickel, copper, iron, tantalum, niobium, and alloys thereof.

(Sealing Plate)

The sealing plate closes the opening of the container.

The sealing plate may be an insulating substance. In particular, the sealing plate preferably includes a rubber member. The rubber member has elasticity. Therefore, when the external lead is inserted into the sealing plate, damage to both the external lead and the sealing plate is easily suppressed. Furthermore, even when the internal pressure increases, the rubber member is deformed, so that cracking or the like of the sealing plate is suppressed, and damage to the internal lead is also suppressed.

Among them, the international rubber hardness degree (IRHD) of the rubber member is preferably less than or equal to 99, and more preferably less than or equal to 95. The IRHD of the rubber member is preferably more than or equal to 70, and more preferably more than or equal to 80. Examples of the elastic polymer constituting such a rubber member include silicone rubber, fluorine-containing rubber, ethylene propylene rubber, chlorosulfonated polyethylene rubber (hypalon rubber or the like), butyl rubber, isoprene rubber, and isobutyl-isoprene rubber. Among them, a fluorine-containing rubber is preferable from the viewpoint of heat resistance. One of the elastic polymers may be used alone, or two or more of the elastic polymers may be used in combination.

A hindered phenol compound may be added to the rubber member. The hindered phenol compound has a first hindered group and a second hindered group respectively at two substitution sites (a first substitution site and a second substitution site) adjacent to a phenolic hydroxy group in a phenol skeleton. The hindered groups each have at least one tertiary carbon atoms, and the hindered groups have one of the tertiary carbon atoms bonded respectively to the substitution sites to make the tertiary carbon atom a quaternary carbon atom in the hindered phenol compound. Specifically, the first and second hindered groups have one of the tertiary carbon atoms directly bonded respectively to the first substitution site and the second substitution site. In the hindered phenol compound having such a structure, the heat resistance is higher than in the case where a hydrogen atom or a primary carbon atom or a secondary carbon atom of a substituent is bonded to the first substitution site and the second substitution site, and decomposition is suppressed even at high temperatures (for example, 155° C.) to hardly cause a mass change. Thus, the hindered phenol compound is left in the rubber member even under a high temperature environment and exerts a radical scavenging function, so that the thermal degradation of the rubber member can be suppressed.

Examples of the hindered phenol compound include pentaerythritol tetrakis[3-(3',5'-di-tert-butyl-4'-hydroxyphenyl)propionate], stearyl 3-(3,5-di-tert-butyl-4-hydroxyphenyl)propionate, 2,4,6-tris(3',5'-di-tert-butyl-4'-hydroxybenzyl)mesitylene, 1,3,5-tris[[3,5-bis(1,1-dimethylethyl)-4-hydroxyphenyl]methyl]-1,3,5-triazine-2,4,6(1H,3H,5H)-trione, and 2,2'-thiodiethylbis[3-(3,5-di-tert-butyl-4-hydroxyphenyl) propionate]. One of the hindered phenol compounds may be used alone, or two or more of the hindered phenol compounds may be used in combination.

A content ratio of the hindered phenol compound added to the rubber member is preferably in a range from 0.5 parts by mass to 6.0 parts by mass inclusive, and more preferably in a range from 0.5 parts by mass to 4.0 parts by mass inclusive, with respect to 100 parts by mass of the elastic polymer.

The rubber member may further include a filler. Fillers include talc, mica, silica, kaolin, titania, alumina, and/or the like. A content ratio of the filler contained in the rubber member is, for example, preferably 10 parts by mass or more, and more preferably 50 parts by mass or more with respect to 100 parts by mass of the elastic polymer.

Further, the rubber member may contain an additive agent (a reinforcing agent (such as carbon black), a crosslinking agent, a crosslinking promoter, a dispersion aid, a modifier, a vulcanizing agent, a vulcanization aid, an antiaging agent and/or a processing aid) as necessary.

The sealing plate may include a resin layer together with the rubber member. The IRHD of the thermosetting resin is usually 100 or more. The resin layer is preferably disposed so as not to hinder elasticity of the rubber member. For example, the resin layer may be formed on an outer surface of the sealing plate. The resin layer preferably occupies less than or equal to 10 volume % of the entire sealing plate. It is particularly preferable that the entire sealing plate is made of a rubber member.

The sealing plate includes one or more insertion ports through which the external lead is inserted. The position of the insertion port is appropriately set according to the position of the external lead. The number of insertion ports is appropriately set according to the number of external leads.

A principal surface of the sealing plate, which faces the bottom surface of the container, may have a recessed part for housing at least a part of the second part of the external lead. This further facilitates positioning of the external lead. In addition, a distance between the external lead and the electrode foil having a polarity different from that of the external lead is easily secured, and a short circuit between the external lead and the electrode foil is easily suppressed.

A principal surface of the sealing plate facing the bottom surface of the container may be provided with a projection protruding toward the bottom surface. Due to this projection, a distance between the external lead and the electrode foil having a polarity different from that of the external lead is easily secured, and a short circuit between the external lead and the electrode foil is easily suppressed. One or more projections may be provided.

In order to prevent a short circuit between the external lead and the electrode foil having a different polarity from the external lead, a size of the separator disposed in a space between the wound body and the sealing plate so as to protrude from the electrode foil may be increased.

Figure 9A:
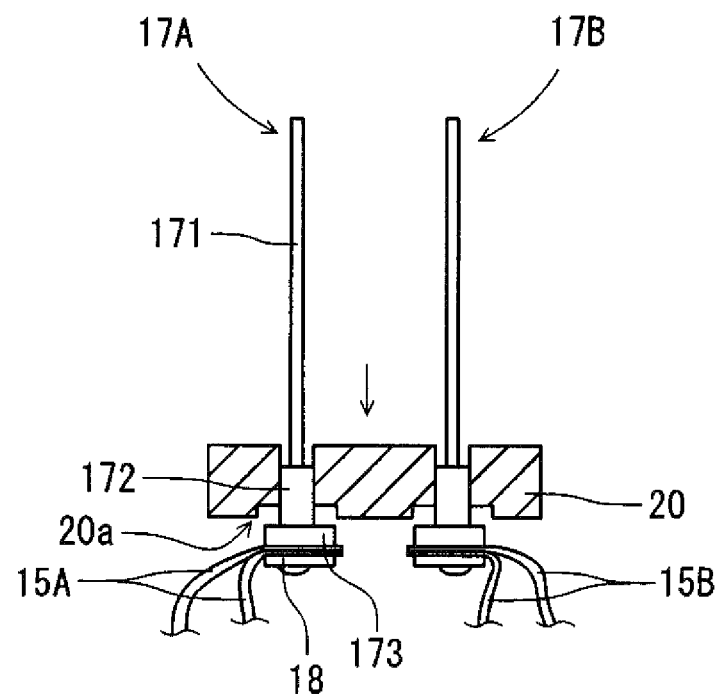
FIG. 9A is a cross-sectional view schematically illustrating an example of a sealing plate according to the exemplary embodiment of the present disclosure.
Figure 9B:
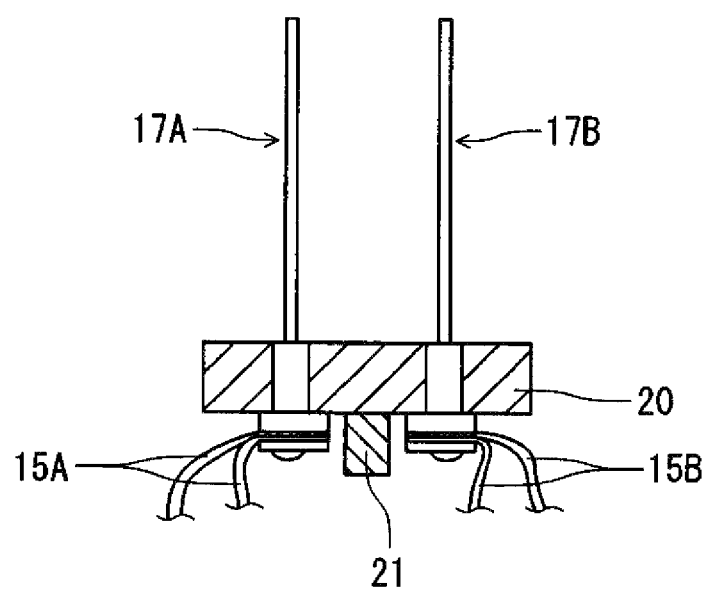
FIG. 9B is a cross-sectional view schematically illustrating another example of the sealing plate according to the exemplary embodiment of the present disclosure.

FIGS. 9A and 9B are side views schematically illustrating an example of the sealing plate according to the present exemplary embodiment. As illustrated in FIG. 9A, recess 20a for housing at least a part of second part 173 of the external lead may be formed on a principal surface of sealing plate 20 facing the bottom surface of the container. This further facilitates positioning of the external lead. Furthermore, the distance between the external lead and the electrode foil having a polarity different from that of the external lead is easily secured, and a short circuit between the external lead and the electrode foil is easily suppressed.

As illustrated in FIG. 9B, projection 21 protruding toward the bottom surface may be provided on the principal surface of sealing plate 20 facing the bottom surface of the container. Due to this projection, a distance between the external lead and the electrode foil having a polarity different from that of the external lead is easily secured, and a short circuit between the external lead and the electrode foil is easily suppressed.

(Container)

The container has an opening. The container includes, for example, a cylindrical part and a bottom surface that closes one end part of the cylindrical part. The other end part (opening end part) of the cylindrical part is closed by the sealing plate. An outer shape of the container is, for example, a columnar shape or a substantially columnar shape.

The material of the container is not particularly limited, and examples thereof include metals such as aluminum, an aluminum alloy, stainless steel, copper, iron, and brass. A surface layer (for example, an oxide layer, a resin layer, or the like) having a desired function may be formed on an outer surface of the container.

(Conductive Polymer)

Examples of the conductive polymer include polypyrrole, polythiophene, polyfuran, polyaniline, polyacetylene, polyphenylene, polyphenylene vinylene, polyacene, and polythiophene vinylene. These may be used singly or in combination of two or more kinds thereof, or may be a copolymer of two or more kinds of monomers.

Note that in the present specification, polypyrrole, polythiophene, polyfuran, polyaniline, and the like mean polymers having, as a basic skeleton, polypyrrole, polythiophene, polyfuran, polyaniline, and the like, respectively. Thus, polypyrrole, polythiophene, polyfuran, polyaniline, and the like each can also include its derivative. For example, polythiophene includes poly(3,4-ethylenedioxythiophene) and the like.

The conductive polymer is dispersed in the dispersion medium, for example, in the form of particles. The particles of the conductive polymer have a mean particle diameter that is not particularly limited, and that can be appropriately adjusted by, for example, polymerization conditions and dispersion conditions. For example, the mean particle diameter of the particles of the conductive polymer may range from 0.01 µm to 0.5 µm, inclusive. Here, the mean particle diameter is a median diameter in a volume particle size distribution measured by a particle diameter measuring device using dynamic light scattering.

The weight-average molecular weight of the conductive polymer may be, for example, in a range from 1000 to 200,000, inclusive, or in a range from 50,000 to 150,000, inclusive.

The conductive polymer may be dispersed in the dispersion medium together with a dopant.

The dopant may be a monomolecular anion or may be a polymeric anion. Specific examples of the monomolecular anion include p-toluenesulfonic acid and naphthalenesulfonic acid. Specific examples of the polymeric anion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used alone or may be used in combination of two or more types. Further, these anions may be a polymer of a single monomer or a copolymer of two or more kinds of monomers. Among them, a polymeric anion derived from polystyrenesulfonic acid is preferable.

The dispersion medium is not particularly limited, and may be water, a non-aqueous solvent, or a mixture thereof. The non-aqueous solvent is a general term for liquids except water, and includes an organic solvent and an ionic liquid. In particular, the dispersion medium may be water from the viewpoint of handleability and dispersibility of the conductive polymer. The water may occupy 50 mass % or more, 70 mass % or more, or 90 mass % or more of the dispersion medium. Examples of the non-aqueous solvent to be used together with water include a polar solvent (a protic solvent and/or an aprotic solvent).

The dispersion liquid containing the conductive polymer can be obtained, for example, by a method of dispersing particles of the conductive polymer in a dispersion medium, a method of polymerizing a precursor monomer of the conductive polymer in a dispersion medium to generate particles of the conductive polymer in the dispersion medium, or the like.

In the dispersion liquid containing the conductive polymer, the content proportion of the conductive polymer may be, for example, more than or equal to 0.5 mass % and less than 5 mass %. The viscosity of the conductive polymer dispersion liquid measured at room temperature (20° C.) using a vibration type viscometer is preferably, for example, less than 100 mPa·s.

(Liquid Component)

The liquid component contains a solvent.

Examples of the solvent include a sulfone compound, a lactone compound, a carbonate compound, and a polyhydric alcohol. Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate (DMC), diethyl carbonate (DEC), ethyl methyl carbonate (EMC), ethylene carbonate (EC), propylene carbonate (PC), and fluoroethylene carbonate (FEC). Examples of the polyhydric alcohol include: glycol compounds such as ethylene glycol (EG), diethylene glycol, triethylene glycol, propylene glycol, and polyethylene glycol (PEG); and glycerin. These compounds may be used alone or in combination of a plurality of types of compound.

In particular, the solvent may contain a compound having two or more hydroxy groups. Examples of such a compound include a polyhydric alcohol. The content proportion of the compound having two or more hydroxy groups in the total solvent may be 50 mass % or more, 60 mass % or more, or 70 mass % or more.

The liquid component may further contain an acid component. When the conductive polymer and the dopant are attached to the electrolytic capacitor, the acid component in the liquid component suppresses the dedoping phenomenon of the dopant and stabilizes the conductivity of the conductive polymer. Further, even when the dopant is dedoped from the conductive polymer, since the acid component of the liquid component is re-doped at the site of the dedoped trace, the ESR is easily maintained low.

It is preferable that the acid component in the liquid component does not excessively increase the viscosity of the liquid component, and generates an anion that easily dissociates in the liquid component and easily moves in the solvent. Examples of such an acid component include aliphatic sulfonic acids having 1 to 30 carbon atoms and aromatic sulfonic acids having 6 to 30 carbon atoms. As the aliphatic sulfonic acid, monovalent saturated aliphatic sulfonic acid (e.g., hexanesulfonic acid) is preferable. As the aromatic sulfonic acid, aromatic sulfonic acid having a hydroxy group or a carboxy group in addition to a sulfo group is preferable, and specifically, oxyaromatic sulfonic acid (e.g., phenol-2-sulfonic acid) and sulfoaromatic carboxylic acid (e.g., p-sulfobenzoic acid, 3-sulfophthalic acid, and 5-sulfosalicylic acid) are preferable.

Examples of other acid components include carboxylic acid. The carboxylic acid preferably contains aromatic carboxylic acid having two or more carboxyl groups (aromatic dicarboxylic acid). Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. In particular, aromatic dicarboxylic acid such as phthalic acid (ortho form) or maleic acid is more preferable. The carboxyl group of the aromatic dicarboxylic acid is stable and is less likely to cause a side reaction to proceed. This causes an effect of stabilizing the conductive polymer to be exhibited over a long period of time, thereby being advantageous in prolonging the life of the electrolytic capacitor. Further, the carboxylic acid may be aliphatic carboxylic acid such as adipic acid.

The acid component may contain a composite compound of organic acid and inorganic acid in terms of thermal stability. Examples of the composite compound of organic acid and inorganic acid include borodisalicylic acid, borodioxalic acid, and borodiglycolic acid that have high heat resistance.

The acid component may include inorganic acid such as boric acid, phosphoric acid, phosphorous acid, hypophosphorous acid, or phosphonic acid.

From the viewpoint of enhancing an effect of suppressing the dedoping phenomenon, a concentration of the acid component may be in a range from 5 mass % to 50 mass %, inclusive, or from 15 mass % to 35 mass %, inclusive.

The liquid component may contain a base component together with an acid component. At least a part of the acid component is neutralized by the base component. This enables corrosion of an electrode due to the acid component to be suppressed while the acid component is increased in concentration. From the viewpoint of effectively suppressing dedoping, the acid component is preferably more excessive than the base component in terms of equivalent ratio.

For example, the equivalent ratio of the acid component to the base component may range from 1 to 30, inclusive. The concentration of the base component in the liquid component may range from 0.1 mass % to 20 mass %, inclusive, or from 3 mass % to 10 mass %, inclusive.

The base component is not particularly limited. Examples of the base component include ammonia, primary amine, secondary amine, tertiary amine, a quaternary ammonium compound, and an amidinium compound. Examples of each amine include aliphatic amine, aromatic amine, and heterocyclic amine.

The pH of the liquid component is preferably less than or equal to 4, more preferably less than or equal to 3.8, still more preferably less than or equal to 3.6. When the pH of the liquid component is less than or equal to 4, deterioration of the conductive polymer is further suppressed. The pH is preferably more than or equal to 2.0.

(Modification Example)

When the internal pressure of the electrolytic capacitor increases, outward stress is applied to the sealing plate. When the sealing plate is rigid, this stress causes damage such as cracking of the sealing plate. When the sealing plate is broken, the internal lead joined to the external terminal may be pulled outward and damaged. In particular, the foil-shaped internal lead is easily damaged.

An electrolytic capacitor according to a modification example of the present exemplary embodiment includes: a first electrode including a first electrode foil, a foil-shaped first internal lead connected to the first electrode foil, and a rod-shaped first external lead connected to the first internal lead; a second electrode; a container that houses the first electrode and the second electrode; and a sealing plate that closes an opening of the container. The first external lead is inserted into an insertion port of the sealing plate and led out of the container.

In the modification example of the present exemplary embodiment, a sealing plate including a rubber member is used. The international rubber hardness degree (IRHD) of the rubber member is less than or equal to 99. Such a rubber member has moderate elasticity. Thus, the rubber member is deformed with an increase in the internal pressure to relax the stress. As a result, damage to the sealing plate is suppressed, and damage to the internal lead is also suppressed. Further, when the external lead is inserted into the sealing plate, damage to both the external lead and the sealing plate is easily suppressed.

The electrolytic capacitor according to the present modification example has the same configuration as the configuration of the present exemplary embodiment described above except that the rubber member included in the sealing plate has an international rubber hardness degree of less than or equal to 99. Further, the electrolytic capacitor according to the present modification example can be manufactured by using the same manufacturing method as the method for manufacturing an electrolytic capacitor described in the present exemplary embodiment. Hereinafter, a configuration of a sealing plate of an electrolytic capacitor according to the present modification example will be mainly described.

(Sealing Plate)

The IRHD of the rubber member is less than or equal to 99. The IRHD of the rubber member is preferably less than or equal to 95. Further, the IRHD of the rubber member is preferably more than or equal to 70, more preferably more than or equal to 80. As the elastic polymer constituting such a rubber member, the material described in the above exemplary embodiment can be used.

The sealing plate is disposed at the opening end part of the container. At this time, the opening end part may be bent inward. The sealing plate including the rubber member is caulked by the opening end part without being damaged. Accordingly, the sealing plate is fixed to the container, and the container is sealed. Further, the container may be recessed inward to compress the rubber member. For example, an annular groove is formed in a part of the container facing the rubber member. As a result, even when a diameter of the rubber member is reduced and an internal pressure rises, the separation of the sealing plate is easily suppressed.

The sealing plate including a rubber member is particularly useful when the electrolytic capacitor is produced by a method of connecting a foil-shaped internal lead and a rod-shaped external lead, and then inserting the external lead into the sealing plate. When the external lead is inserted into the sealing plate, the internal lead is already connected to the external lead. The foil-shaped internal lead is easily damaged as described above. Thus, when the external lead is inserted into the sealing plate, it is necessary to prevent a load from being applied to the internal lead. When the sealing plate has elasticity, it is easy to insert the external lead into the sealing plate while reducing the load on the external lead and the internal lead as much as possible by deforming the sealing plate.

A method of connecting the foil-shaped internal lead and the external lead and then inserting the external lead into the sealing plate is preferable in that ESR of the electrolytic capacitor can be suppressed. When a member in which a sealing plate and an external lead are integrated is used and an internal lead is bonded thereto as in Unexamined Japanese Patent Publication No. H10-229032, it is necessary to sufficiently lead out the internal lead from the electrode foil so that the sealing plate does not interfere with a jig or the like of the joint device. The internal lead led out long increases the resistance of the capacitor element, resulting in an increase in ESR of the electrolytic capacitor. On the other hand, when the external lead is inserted into the sealing plate after the internal lead and the external lead are connected, it is not necessary to lead out the internal lead long in order to prevent interference between the sealing plate and a jig or the like of the joint device. Thus, an increase in resistance due to the internal lead can be suppressed.

The length of the first lead-out part from the end surface of the first electrode foil of the first internal lead to the contact part with the first external lead is, for example, less than or equal to maximum diameter R of the container. The length of the first lead-out part is preferably less than or equal to 50% of maximum diameter R of the container. As described above, since the damage of the sealing plate is suppressed, the internal lead is also suppressed from being pulled outward. Thus, even when the internal lead is short as described above, damage to the internal lead is suppressed.

The second electrode preferably has a configuration similar to that of the first electrode in that the ESR is more easily reduced. That is, the second electrode preferably includes a second electrode foil, a foil-shaped second internal lead connected to the second electrode foil, and a rod-shaped second external lead connected to the second internal lead. In this case, the length of the second lead-out part from the end surface of the second electrode foil of the second internal lead to the contact part with the second external lead can be made less than or equal to maximum diameter R of the container. The length of the second lead-out part is preferably less than or equal to 50% of maximum diameter R of the container.

What is claimed is:

1. An electrolytic capacitor comprising:
a first electrode including a first electrode foil, a first internal lead having a foil shape and connected to the first electrode foil, and a first external lead having a rod shape and connected to the first internal lead;
a second electrode;
a container that houses the first electrode and the second electrode; and
a sealing plate that closes an opening of the container, wherein:
the first internal lead includes a through hole penetrating in a direction perpendicular to a principal surface of the first internal lead,
the first external lead includes a lead main body part, a first part, and a second part disposed closer to a connecting part with the first internal lead than the first part, the first external lead being inserted into an insertion port of the sealing plate and led out of the container,
the first part closes at least a part of the insertion port of the sealing plate,
a diameter of the second part is larger than an inner diameter of the insertion port, a diameter of the first part, and a diameter of the lead main body part,
the diameter of the lead main body part is smaller than the diameter of the first part,
the lead main body part is inserted into the through hole of the first internal lead, and is fixed to the first internal lead by one end part of the lead main body part being crushed,
the principal surface of the first internal lead faces and is in direct contact with the second part, and
a length of a first lead-out part of the first internal lead is less than or equal to a maximum diameter of the container, the first lead-out part being a part from an end surface of the first electrode foil to a contact part with the first external lead.

2. The electrolytic capacitor according to claim 1, wherein the length of the first lead-out part is less than or equal to 50% of the maximum diameter of the container.

3. The electrolytic capacitor according to claim 1, wherein the first lead-out part of the first internal lead includes a bent part that bends from a direction toward the opening to a direction intersecting the direction toward the opening.

4. The electrolytic capacitor according to claim 1, wherein:
the second electrode includes a second electrode foil, a second internal lead having a foil shape and connected to the second electrode foil, and a second external lead having a rod shape and connected to the second internal lead, and
a length of a second lead-out part of the second internal lead is less than or equal to the maximum diameter of the container, the second lead-out part being a part from an end surface of the second electrode foil of the second internal lead to a contact part with the second external lead.

5. The electrolytic capacitor according to claim 4, wherein the length of the second lead-out part is less than or equal to 50% of the maximum diameter of the container.

6. The electrolytic capacitor according to claim 4, wherein:
a plurality of second internal leads including the second internal lead are connected to the second electrode foil, and the plurality of second internal leads are collectively connected to the second external lead.

7. The electrolytic capacitor according to claim 1, wherein:
the sealing plate includes a rubber member, and is disposed at an opening end part of the container,
the opening end part of the container is bent inward, and the container is recessed inward to compress the rubber member.

8. The electrolytic capacitor according to claim 1, wherein a principal surface of the sealing plate has a recess that houses at least a part of the second part of the first external lead, the principal surface facing a bottom of the container.

9. The electrolytic capacitor according to claim 1, wherein:
a plurality of first internal leads including the first internal lead are connected to the first electrode foil, and
the plurality of first internal leads are collectively connected to the first external lead.

10. The electrolytic capacitor according to claim 1, wherein the first electrode and the second electrode are stacked.

11. The electrolytic capacitor according to claim 1, wherein a conductive polymer is attached to the first electrode foil.

12. The electrolytic capacitor according to claim 1, wherein the first electrode foil is impregnated with a liquid component.

13. An electrolytic capacitor comprising:
a first electrode including a first electrode foil, a first internal lead having a foil shape and connected to the first electrode foil, and a first external lead having a rod shape and connected to the first internal lead;
a second electrode;
a container that houses the first electrode and the second electrode; and
a sealing plate that closes an opening of the container, wherein:
the first external lead is inserted into an insertion port of the sealing plate and led out of the container,
the sealing plate includes a rubber member and a resin layer disposed at an outer surface of the sealing plate,
an international rubber hardness degree of the rubber member is more than or equal to 80 and less than or equal to 99,
the resin layer is made of a thermosetting resin, and
an international rubber hardness degree of the resin layer is more than or equal to 100.

14. The electrolytic capacitor according to claim 13, wherein:
the sealing plate is disposed at an opening end part of the container,
the opening end part is bent inward, and
the container is recessed inward to compress the rubber member.

15. The electrolytic capacitor according to claim 13, wherein a length of a first lead-out part of the first internal lead is less than or equal to a maximum diameter of the container, the first lead-out part being a part from an end surface of the first electrode foil to a contact part with the first external lead.

16. The electrolytic capacitor according to claim 13, wherein a first lead-out part of the first internal lead includes a bent part that bends from a direction toward the opening to a direction intersecting the direction toward the opening, the first lead-out part being a part from an end surface of the first electrode foil to a contact part with the first external lead.

17. The electrolytic capacitor according to claim 13, wherein:
   the second electrode includes a second electrode foil, a second internal lead having a foil shape and connected to the second electrode foil, and a second external lead having a rod shape and connected to the second internal lead, and
   the second external lead is inserted into another insertion port of the sealing plate and led out of the container.

* * * * *